(12) United States Patent
Hills

(10) Patent No.: US 6,711,148 B1
(45) Date of Patent: *Mar. 23, 2004

(54) METHOD FOR CONFIGURING A WIRELESS NETWORK

(75) Inventor: Alexander H. Hills, Palmer, AK (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/546,852

(22) Filed: Apr. 10, 2000

(51) Int. Cl.[7] .............................................. H04Q 7/20
(52) U.S. Cl. ..................... 370/338; 455/422; 455/446
(58) Field of Search ................................ 370/310, 328, 370/335–336, 338; 455/403, 422, 442, 446–449, 7, 25, 500

(56) References Cited

U.S. PATENT DOCUMENTS

| | | | |
|---|---|---|---|
| 5,363,376 A | | 11/1994 | Chuang et al. |
| 5,412,658 A | | 5/1995 | Arnold et al. |
| 5,465,390 A | * | 11/1995 | Cohen .......................... 455/446 |
| 5,491,644 A | * | 2/1996 | Pickering et al. ........... 709/226 |
| 5,668,562 A | * | 9/1997 | Cutrer et al. ................. 343/703 |
| 5,710,758 A | | 1/1998 | Soliman et al. |
| 5,726,984 A | | 3/1998 | Kubler et al. |
| 5,880,868 A | * | 3/1999 | Mahany ....................... 398/115 |
| 5,963,867 A | * | 10/1999 | Reynolds et al. ............. 455/457 |
| 6,091,951 A | | 7/2000 | Sturniolo et al. |
| 6,140,911 A | * | 10/2000 | Fisher et al. ............. 340/310.01 |
| 6,259,898 B1 | * | 7/2001 | Lewis .......................... 455/103 |
| 6,496,499 B1 | * | 12/2002 | Hamilton et al. ............ 370/348 |
| 6,505,045 B1 | * | 1/2003 | Hills et al. ................... 455/449 |
| 6,636,737 B1 | | 10/2003 | Hills et al. |

FOREIGN PATENT DOCUMENTS

EP    0 941 003    9/1999

OTHER PUBLICATIONS

Scarati et al., Radio Coverage for Cellular Networks Planning : a Methodical Approach, 1993, IEEE International Conference, pp. 940–945.*

* cited by examiner

Primary Examiner—Chi Pham
Assistant Examiner—Andrew M. Waxman
(74) Attorney, Agent, or Firm—Kirkpatrick & Lockhart LLP

(57) ABSTRACT

A method for establishing the location of access points for a network providing wireless communications coverage for an environment, including determining a coverage radius of an access point at certain locations within the environment, determining an average coverage radius of the access points for the environment based on the determined coverage radii, and positioning the access points at locations within the environment to provide continuous wireless coverage for the environment based on the average coverage radius.

19 Claims, 18 Drawing Sheets

METHOD FOR CONFIGURING A WIRELESS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention is directed generally to wireless communication networks and, more particularly, to methods for configuring wireless networks.

2. Description of the Background

Wireless local area networks (WLANs) were originally intended to allow wireless connections to a wired local area network (LAN), such as where premises wiring systems were nonexistent or inadequate to support conventional wired LANS. A block diagram of a typical WLAN 10 is illustrated in FIG. 1. The WLAN 10 includes a mobile device 12 including a network adapter (NA) 14, a number of access points (APs) $16_{1-x}$, and a wired LAN 18. The APs 16 are typically radio base stations, each mounted in a separate fixed position and connected to the wired LAN 18. The NA 14 communicates with the APs 16 by formatted wireless communication signals to provide an interface between the computing device 12 and the wired LAN 18. Because network adapters 14 are now available in compact PC card form, WLANs are often used to service mobile computing devices, such as laptop computers and personal digital assistants (PDAs), thus providing mobile connectivity to data networks, such as the Internet or an intranet.

In designing a WLAN, care must be taken in locating the APs 16 to ensure adequate radio coverage throughout the service area of the WLAN 10, while minimizing the costs associated with the installation of each AP 16. The APs 16 must be configured to eliminate coverage gaps and to provide adequate coverage for areas of highly-concentrated wireless traffic. The APs 16, however, must not be placed so closely that proximate APs 16 interfere with each other. Implementing a WLAN 10 inside a building complicates the design because the layout and construction of the building affect the wireless signal transmissions between the NAs 14 and the APs 16. For example, while wood, plaster, and glass are not serious barriers to the WLAN radio transmissions, brick and concrete walls can attenuate the signals beyond an acceptable threshold. In addition, the greatest obstacle to the wireless transmissions between the NAs 14 and APs 16 commonly found in all building environments is metal. For example, the metal used in desks, filing cabinets, reinforced concrete, and elevator shafts can significantly attenuate the signals transmitted between the NAs 14 and the APs 16, thus degrading network performance.

In addition, the communication schemes for transmitting signals between the NAs 14 of the mobile devices 12 and the APs 16 are typically contention-oriented, such as the IEEE 802.11 protocol, in order that all the mobile units in the environment may share the limited bandwidth resource. Such a contention-oriented protocol makes signal interference between the APs 16 undesirable because if one AP 16 can "hear" another, it will defer to the other just as it would defer to a mobile device transmitting within its coverage area. Thus, signal interference between APs 16 degrades performance. Similarly, if a mobile device 12 can be heard by more than one AP 16, all the APs 16 in communication with the mobile device will defer.

Accordingly, there exists a need for a method for designing a wireless network to provide adequate coverage which minimizes cost and maximizes network performance. There also exists a need for a method for designing a wireless network to handle concentrated areas of traffic, yet which does not introduce interference between access points.

BRIEF SUMMARY OF INVENTION

The present invention is directed to a method for establishing the location of access points for a network providing wireless communications coverage for an environment. According to one embodiment, the method includes determining a coverage radius of an access point at certain locations within the environment, determining an average coverage radius of the access points for the environment based on the determined coverage radii, and positioning the access points at locations within the environment to provide continuous wireless coverage for the environment based on the average coverage radius.

According to another embodiment, the present invention is directed to a method for assigning channels for access points for a network providing wireless communications coverage for an environment, including assigning a weight indicative of overlapping coverage for each pair of access points having overlapping coverage, and assigning a channel to each of the access points based on certain sums of the weights to minimize coverage overlap between access points operating at the same channel.

According to another embodiment, the present invention is directed to a method for configuring access points of a network providing wireless communications coverage for an environment, including determining a coverage radius of an access point at certain locations within the environment, determining an average coverage radius of the access points for the environment based on the determined coverage radii, positioning the access points at locations within the environment to provide continuous wireless coverage for the environment based on the average coverage radii, assigning a weight indicative of overlapping coverage for each pair of access points having overlapping coverage, and assigning a channel to each of the access points based on certain sums of the weights to minimize coverage overlap between access points operating at the same channel.

The present invention represents an advantage over prior means for configuring a wireless network in that it provides a method for configuring a wireless network to provide adequate coverage which minimizes cost and maximizes network performance. The present invention also represents an advantage in that it provides a method for configuring a wireless network to handle concentrated areas of traffic, yet minimizes interference between access points. These and other advantages of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
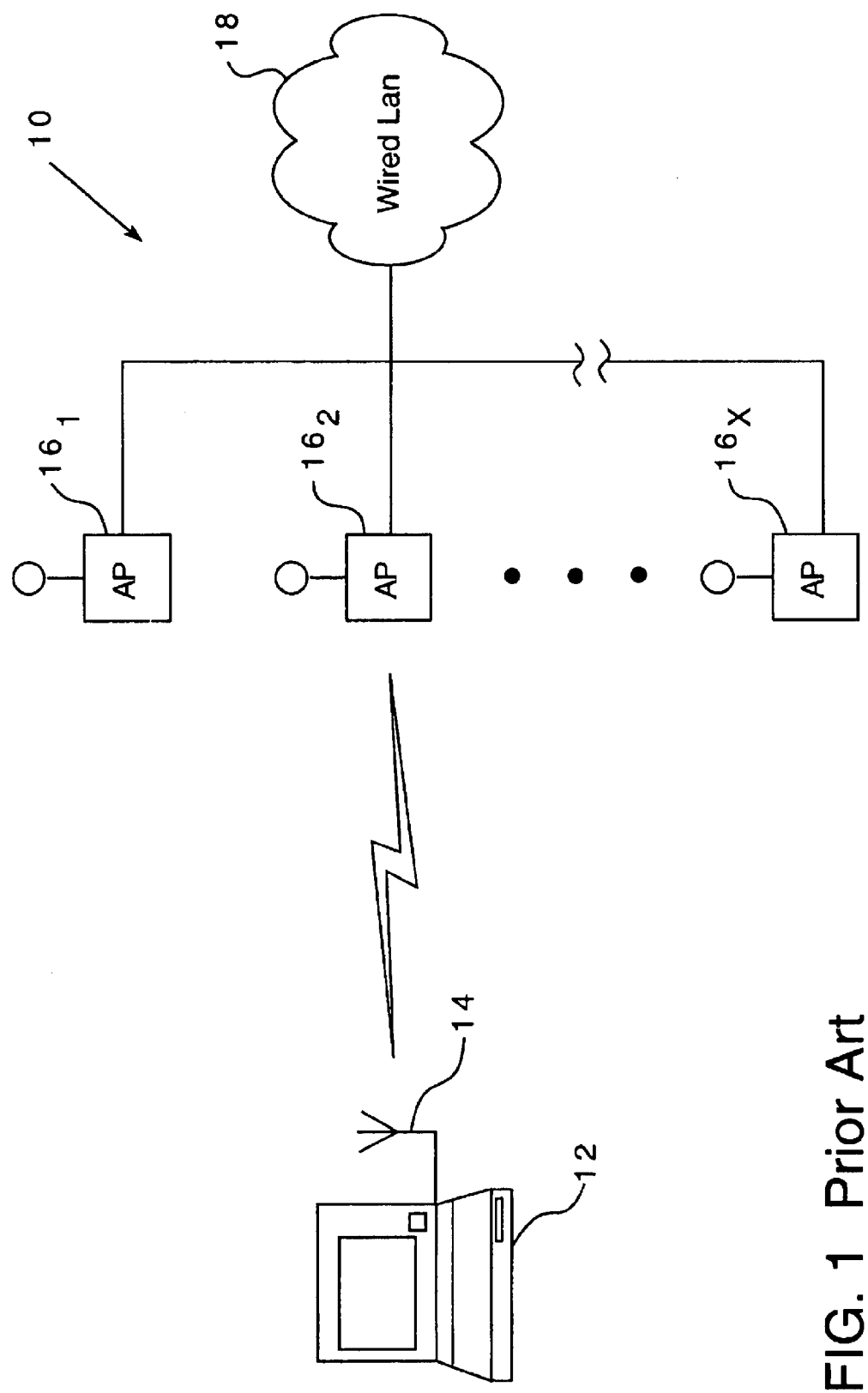
FIG. 1 is a block diagram of a wireless local area network (WLAN)

According to one embodiment, the present invention is directed to a method for configuring the access points of a wireless network, such as the WLAN 10 illustrated in FIG. 1, for a particular environment such as, for example, an indoor environment. The WLAN 10 may be, for example, an IEEE 802 compliant network. The wired LAN 18 may be in communication with the APs 16 through a router, such as a 7500 series router available from Cisco Systems, Inc., a number of switches, such as Catalyst® 5000 and 1924 series switches, and a hub, such as a Bay Networks 2813 hub. These components may communicate, for example, via 100BASE-T, 10BASE-T, 100BASE-FL, and 10BASE-FL communication links.

The computing device 12 may be, for example, a laptop computer or a digital personal assistant (PDA), and may communicate with the APs 16, and therefore the wired LAN 18, via the network adapter (NA) 14. The NA 14 may include a transmitter, a receiver, an antenna, and hardware to provide a data interface between the computing device 12 and the APs 16. According to one embodiment, the NA 14 is a compact PC card installed in the computing device 12. The WLAN 10 may operate, for example, in the unlicensed ISM bands at 915 MHz, 2.4 GHz, and 5.7 GHz. Spread spectrum techniques such as, for example, direct sequence and frequency hopping, may be used at these frequencies.

The APs 16 may be, for example, WavePoint™ access points, available from Lucent Technologies, Inc. Each AP 16 may be a wireless base station that is mounted in a fixed position. Each AP 16 allows network adapter-equipped computing devices 12 to communicate with the wired LAN 18. The APs 16 may include a transmitter, receiver, an antenna, and a bridge. The bridge routes packets of data to and from the wired LAN 18 as appropriate. The APs 16 may be configured to ensure adequate wireless signal coverage throughout the service area of the WLAN 10. APs 16 typically have a range of up to 250 meters in an open environment. However, in an indoor environment, the range may be reduced to 30–60 meters because of building obstacles. For an embodiment in which some of the APs 16 are mounted within a building, this requires that the APs 16 be configured within the building to provide adequate coverage despite the many obstacles to wireless signal transmission presented by the building.

Figure 2:
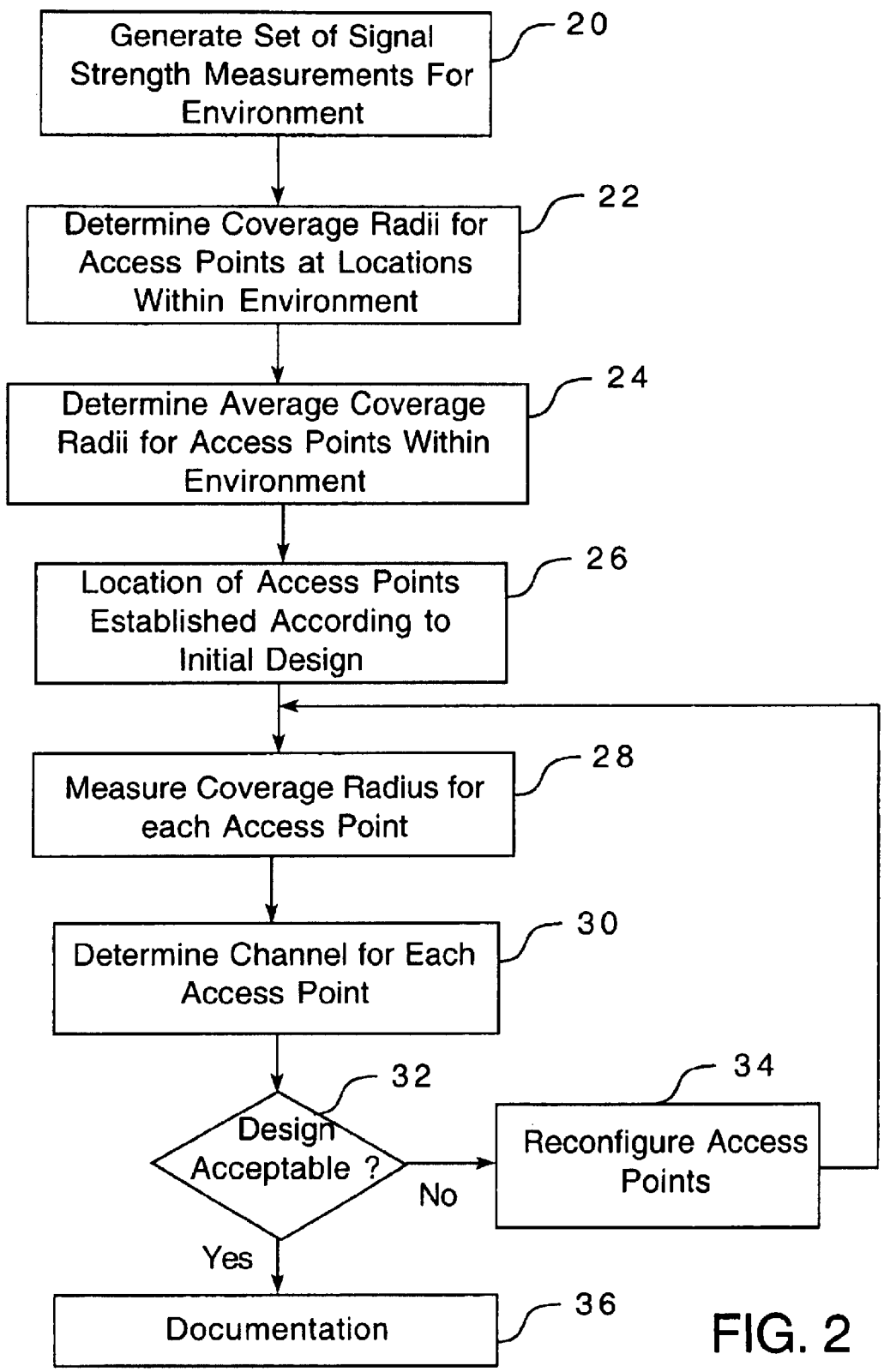
FIG. 2 is a flowchart illustrating a method for configuring the access points of the WLAN of FIG. 1 according to one embodiment of the present invention.

FIG. 2 is a flow chart illustrating the method for configuring the APs 16 of a wireless network according to one embodiment of the present invention. The method will be described with reference to the WLAN 10 illustrated in FIG. 1, although benefits of the present invention may be realized in using the method of the present invention to configure other types of wireless networks. The method begins at block 20, where a set of signal strength measurements within the environment is generated. The set may be generated by placing an AP 16 at various locations within the environment and measuring its radiation pattern, accounting for the signal propagation obstacles in the environment. The signal strength measurements may be made in all areas of the environment requiring network coverage, with particular attention paid to the construction of the environment, so that the characteristics within each part of the environment of a particular construction type are understood. Based on the set of signal strength measurements, the environment may be conceptually divided into regions which are relatively isolated from each other, from a wireless signal propagation perspective. Each of these regions may be treated independently in the subsequent steps of the illustrated method.

At block 22, the coverage radius of the APs 16 at particular locations within the environment are determined. The coverage radius may be the point from the AP 16 at which the signal strength attenuates below some threshold level, and may be determined based on the generated set of signal strength measurements. According to one embodiment of the present invention in which the wireless network is to service a one-story building (or a multi-story building only requiring wireless connectivity coverage for only a single floor or where certain floors of a multi-floor building are to be treated separately), the coverage radii of the APs 16 on the floor on which they are located are determined. For an embodiment of the present invention in which the wireless network is to service a multi-story building, in addition to determining the coverage radii of the APs 16 on which they are located, the coverage radii on the floors immediately above and immediately below the floor on which the APs 16 are located are determined.

Figure 3:
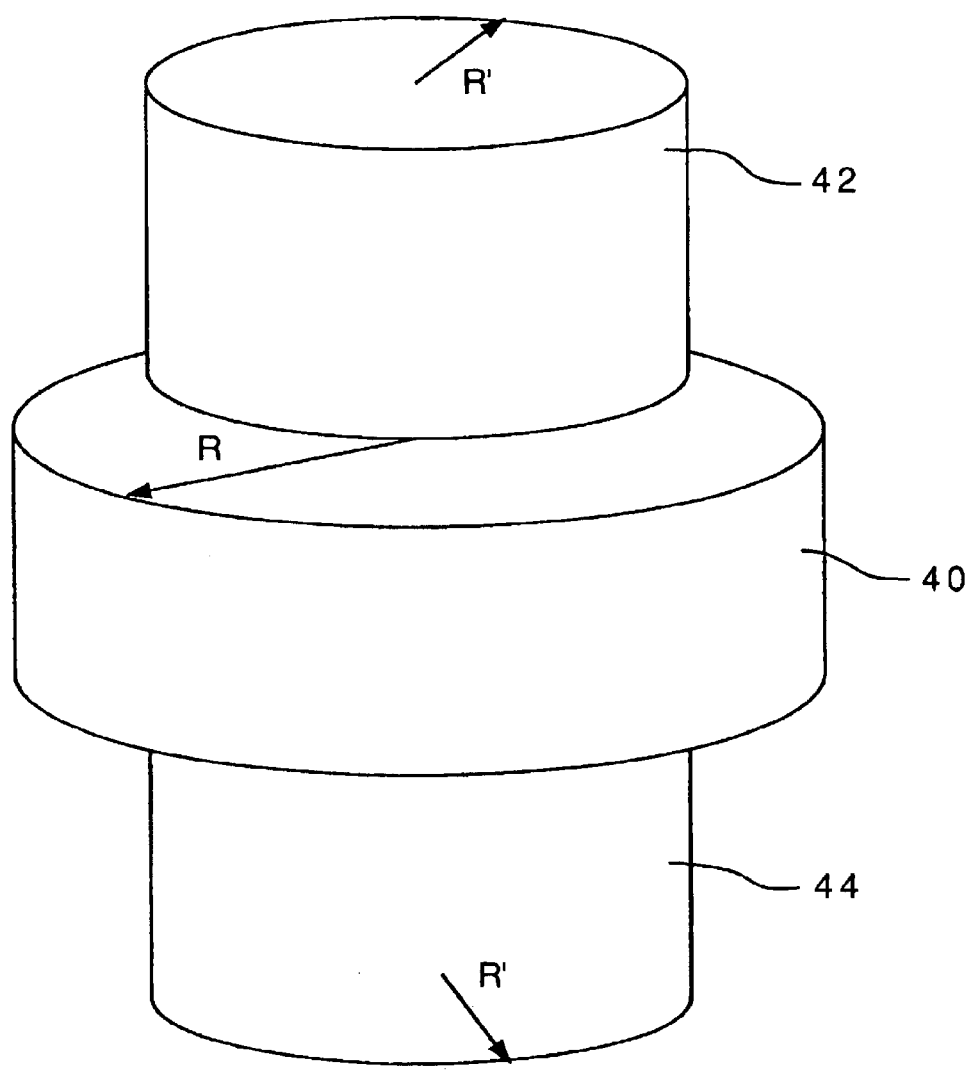
FIG. 3 is a graphical representation of the coverage area of an access point of the WLAN of FIG. 1.

At block 24, the average coverage radii of the APs 16 within the environment are calculated. The average coverage radii may be determined based on the prior measurements. For an embodiment in which the environment is a one-story building (or a multi-floor building requiring wireless coverage for only a single floor or for a multi-floor building in which all or some of the floors are treated separately), the average coverage radii for the floor on which the APs 16 are located are determined. For an embodiment in which the environment includes two or more contiguous floors of a building, the average coverage radii for the floor on which the APs 16 are located are determined as well as the average coverage radii on the immediately adjacent floors. As used herein, R denotes the average coverage radius of an AP 16 on the floor on which the AP 16 is located, and R' denotes the average coverage radius of the AP 16 on an immediately adjacent floor. Typically R' will be less than R because of the attenuation of radio signals through floors of the building. Based on R and R', the coverage radius of a particular AP 16 located on a particular floor may be conceptualized as three coaxial cylinders 40, 42, 44, as illustrated in FIG. 3. The cylinder 40 represents the coverage area for the AP 16 for the floor on which it is located. The cylinders 42 and 44 represent the coverage area of the AP 16 on the floors immediately above and below the floor on which the AP 16 is located, respectively. The height of each cylinder 40, 42, 44, may be conceptualized as the height of the floors of the building.

At block 26, the locations of the APs 16 are established according to an initial design. According to one embodiment, the location of the APs 16 are established to provide adequate signal coverage in all areas of the environment requiring wireless access. For such an embodiment, this may be conceptualized as arranging the coverage area cylinders 40, 42, 44 for each AP 16 such that at least a portion of one cylinder 40, 42, 44 extends into all areas of the environment. The coverage area cylinders 40, 42, 44 for separate APs 16 may overlap. Such overlapping, however, may be minimized to reduce the potential interference between the separate APs 16.

The initial design may be generated according to calculated parameters. The first parameter, denoted D, represents the distance between the APs 16 on the same floor of the building, and may be calculated according to the following equation:

$$D = R\sqrt{2\left[1 + \sqrt{1 - \left[1 - (R'/R)^2\right]^2}\right]}, \text{ where } 0 < R'/R < 1. \quad (1)$$

The second parameter, denoted D', represents the spacing between the APs 16 on adjacent floors of the building, and may be calculated according to:

$$D' = D/\sqrt{2} = D\sqrt{2}/2. \quad (2)$$

Note that for an embodiment of the present invention in which the wireless network is to be implemented in a one-story building (or to only provide wireless access on one floor of a multi-floor building or where certain floors of a multi-floor building are to be treated separately), R'=0 and D=R√2.

Examples of establishing the location of the APs 16 for different indoor environments are described hereinbelow with reference to FIGS. 4–15.

Having established the location of the APs 16 according to an initial design, the process continues to block 28, where the coverage radius for each of the APs 16 of the network 10 is measured. This may be accomplished, for example, by measuring the signal strength for each of the APs 16.

From block 28, the process advances to block 30 where the channel for each of the APs 16 is determined. The channels may be assigned based on the degree of overlapping coverage between APs 16, which may be determined from the measured coverage radii of the APs 16 (block 28). The channels may be, for example, frequency allocations for networks employing frequency division multiple access (FDMA), or time slot allocations for networks employing time division multiple access (TDMA). According to one embodiment, the channels may be assigned to the APs 16 to minimize the overlapping coverage areas for co-channel APs 16. Minimization of overlapping co-channel APs 16 is often desirable for wireless networks to reduce performance degradation. Methods for assigning channels for the APs 16 will be described hereinbelow with respect to FIGS. 16–18.

At block 32, it is then determined whether the configuration of APs 16 is acceptable based on the measurements. The configuration may not be acceptable if, for example, coverage gaps and/or excessive co-channel coverage overlaps exist. If the configuration is not acceptable, the process flow continues to block 34 where the APs 16 are reconfigured to realize an acceptable configuration. That is, the APs 16 may, for example, be reconfigured to eliminate coverage gaps and/or reduce co-channel coverage overlaps. The process flow then returns to block 28, where the coverage radius for each of the APs 16 is measured.

Conversely, if at block 32 it is determined that the design is acceptable, the process flow advances to block 36, where the final configuration and the measured coverage radius for each of the APs 16 may be documented.

Establishing the locations of the APs 16 for the wireless network is now further discussed with reference to the following examples.

EXAMPLE 1

Figure 4:
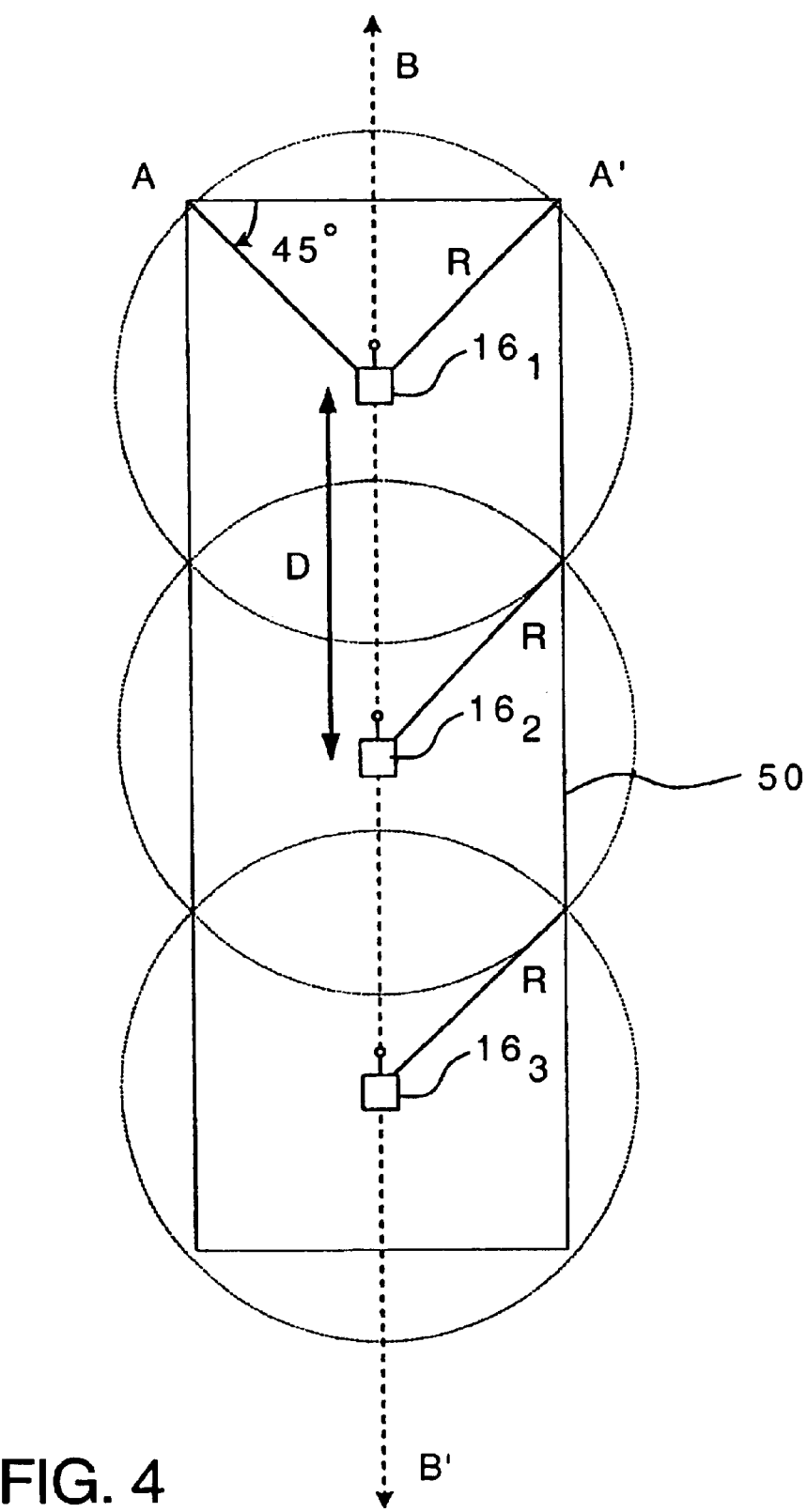
FIG. 4 is a graphical representation for establishing the location of the access points of the WLAN of FIG. 1 for a single floor environment according to one embodiment of the present invention where the width of the floor is no greater than the average coverage radius of the access points times $\sqrt{2}$.

FIG. 4 illustrates one embodiment of the present invention, in which a wireless network is to be implemented for a single floor of a building 50, in which the width of the floor is no greater than R√2. The described method for establishing the location of the APs 16 may be followed, for example, where the building 50 has one story, where only one floor of a multi-floor building 50 require wireless coverage, or where certain floors of a multi-floor building are to be treated separately.

According to one embodiment, a first AP 16₁ may be positioned at the intersection of a line extending at an angle relative to a corner A of the building 50, such as at a 45° degree angle, and a line B–B' bisecting the building 50 lengthwise. The location of the AP 16₁ may be adjusted such that the coverage area of the AP 16₁ extends to two corners (A, A') of the building 50.

Subsequently, a second AP 16₂ may be placed a distance D along bisector B–B' from the first AP 16₁, where D=R√2. The location of the second AP 162 may be adjusted, and the coverage radius of the AP 16₂ re-measured, such that the coverage area of the second AP 16₂ at the edges of the building 50 coincides with the coverage area of the first AP 16₁. The process may be repeated until each area of the floor of the building 50 is within the coverage area of at least one AP 16, as illustrated in FIG. 4.

EXAMPLE 2

Figure 5:
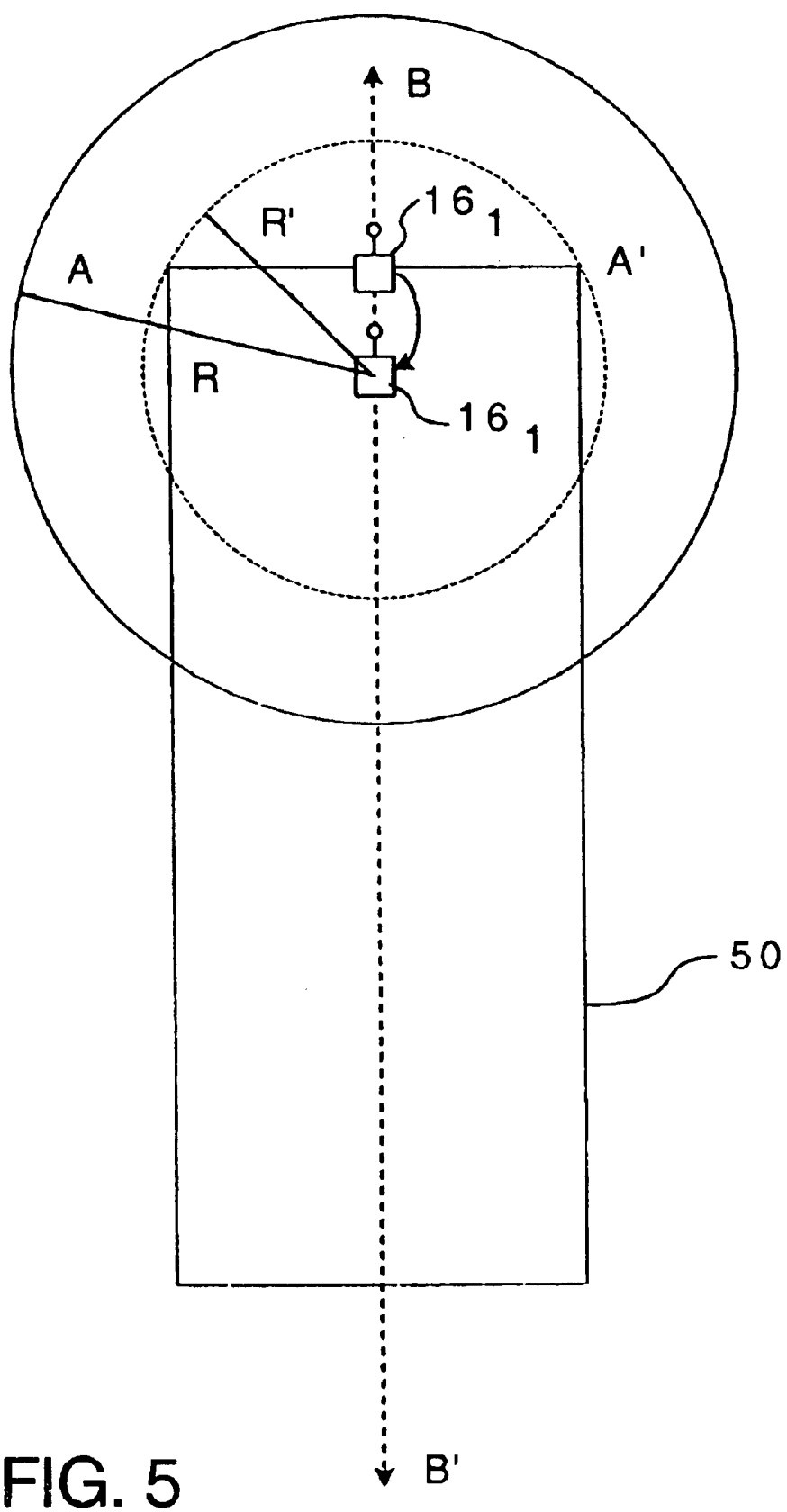
FIGS. 5 and 6 are graphical representations for establishing the location of the access points of the WLAN of FIG. 1 for a multi-floor environment according to one embodiment of the present invention where the width of the floors is no greater than the average coverage radius of the access points times $\sqrt{2}$.
Figure 6:
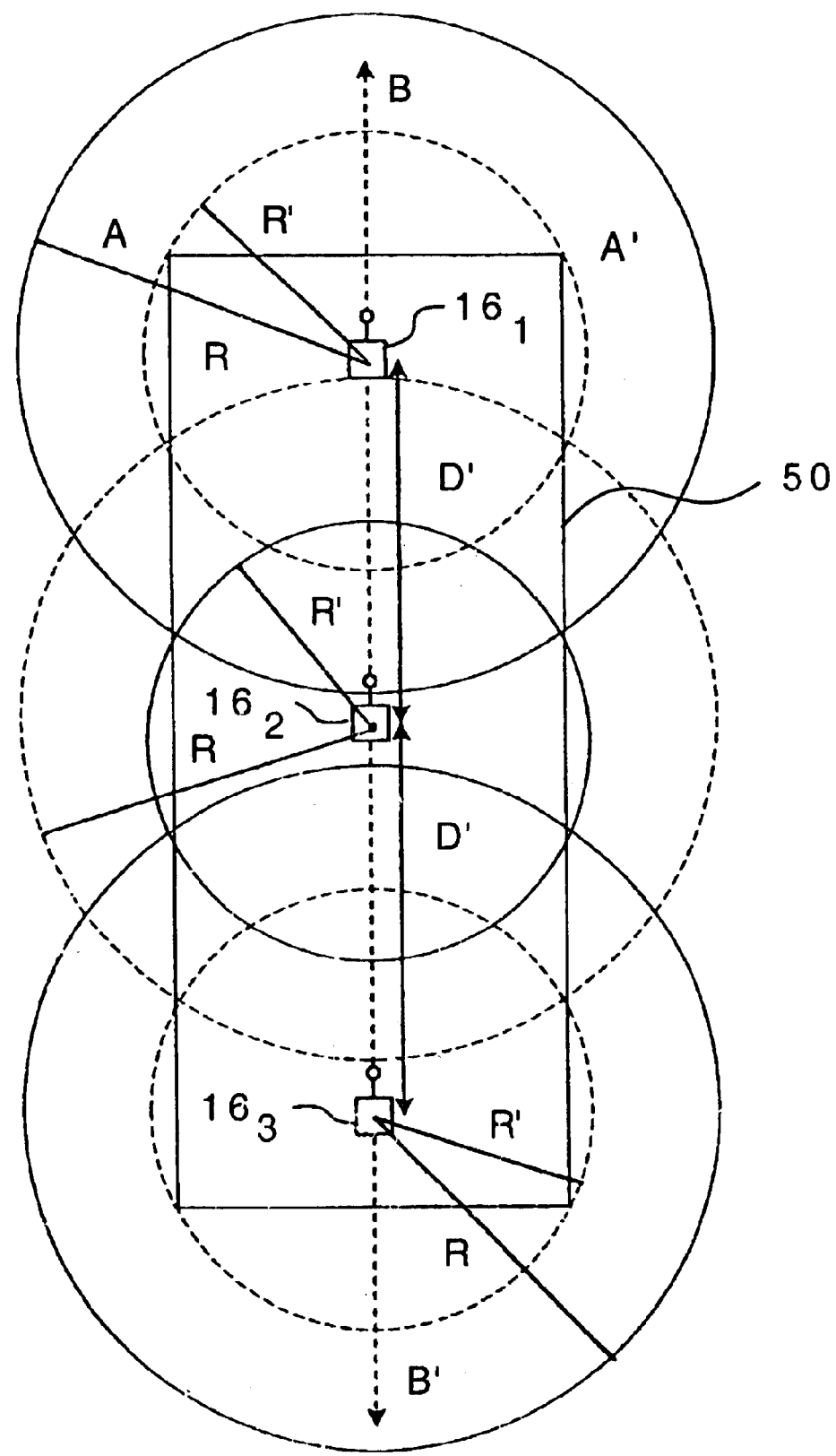

FIGS. 5 and 6 illustrate another embodiment of the present invention, in which a wireless network is to be implemented to provide wireless coverage for a number of contiguous floors of a multi-floor building 50 where the width of the floors is no greater than R√2. According to one embodiment, as illustrated in FIG. 5, a first AP 16₁ may be placed on a second floor of the contiguous floors of the building 50 at the intersection of an edge of the building 50 and the line B–B' bisecting the building 50 lengthwise. The position of the first AP 16₁ may be adjusted such as, for example, by moving the first AP $16_1$ along the bisecting line B–B' such that the coverage area of the first AP $16_1$ on a first floor of the building 50 immediately below the second floor, having an approximate coverage radius of R', extends to two corners (A, A') of the building on the first floor. It should be noted that the reference here and elsewhere to "first" and "second" floors does not necessarily refer to the first and second floor of a building as those terms are conventionally used, but instead refer to any two floors of a multi-floor building.

If the width of the building 50 is greater than 2R', then each floor may be treated independently, such as according to the embodiment discussed hereinbefore with respect to Example 1. For the illustrated embodiment, the coverage areas of the APs 16 for the second floor of the building are shown in solid lines, and the coverage areas of the APs 16 on the first floor of the building are shown in dashed lines, regardless of on what floor the APs 16 are located.

As illustrated in FIG. 6, a second AP $16_2$ may be placed a distance D' from the first AP $16_1$ on the first floor, where D' is determined according to equation (2). The location of the second AP $16_2$ on the first floor may be adjusted such that the edges of the coverage areas of the second AP $16_2$ coincide with the edges of the first AP $16_1$ on both the first and second floors.

A third AP $16_3$ may be placed at a distance D' from the second AP $16_1$ on the second floor. The location of the third AP $16_3$ on the second floor may be adjusted such that the edges of the coverage areas of the third AP $16_3$ coincide with the edges of the second AP $16_2$ on both the first and second floors. Additional APs 16 may placed alternately on the first and second floors in the described fashion until complete wireless coverage is provided on the first and second floors.

To provide wireless coverage for additional contiguous floors of the building 50 having a width no greater than $R\sqrt{2}$, a number of APs 16 may be placed on the third floor of the building directly above the APs 16 located on the first floor (assuming the second floor is between the first and third floor). The locations of the APs 16 on the third floor may be adjusted such that the APs 16 on the second and third floors provide complete wireless coverage for the third floor. In addition, a number of APs 16 may be placed on the fourth floor of the building directly above the APs 16 located on the second floor (assuming the third floor is between the second and fourth floors). The locations of the APs 16 on the fourth floor may be adjusted such that the APs 16 on the third and fourth floors provide complete wireless coverage on the fourth floor. Additional APs 16 may be placed on additional contiguous floors of the building 50 and their locations adjusted according to the above-described method to provide wireless coverage on the additional floors of the building.

EXAMPLE 3

FIGS. 7–10 illustrate another embodiment of the present invention, in which a wireless network is implemented on one floor of a building 50 whose width is greater than $R\sqrt{2}$. The described method for establishing the location of the APs 16 may be followed, for example, where the building 50 has one story, where only one floor of a multi-floor building 50 requires wireless coverage, or where certain floors of a multi-floor building are to be treated separately.

Figure 7:
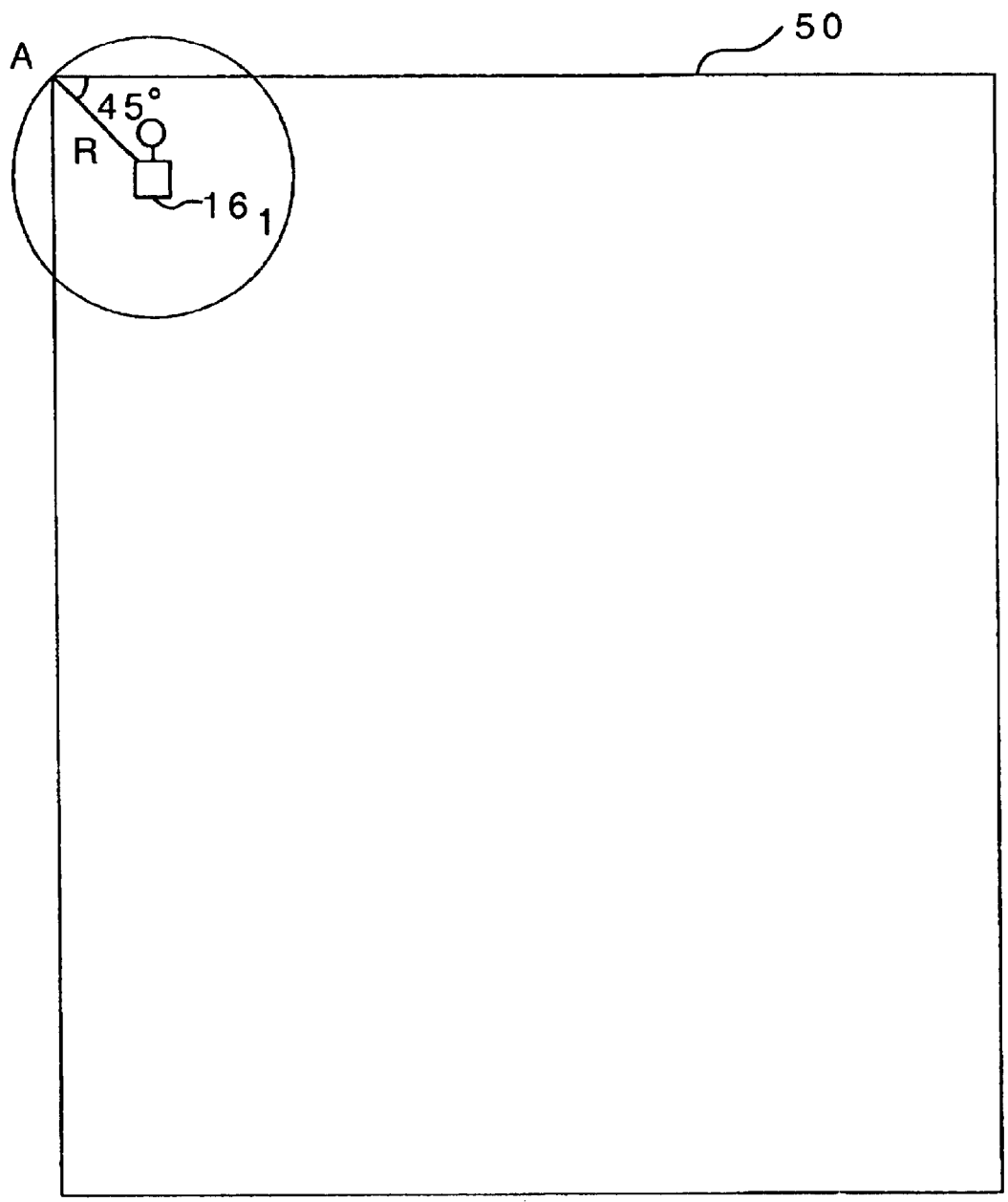
FIGS. 7–10 are graphical representations for establishing the location of the access points of the WLAN of FIG. 1 for a single floor environment according to one embodiment of the present invention where the width of the floor is greater than the average coverage radius of the access points times $\sqrt{2}$.

According to one embodiment, as illustrated in FIG. 7, a first AP 16, may be located at the distance R from a corner A of the building 50 along a line extending from the corner, such as on a 45° angle. The location of the first AP $16_1$ may be adjusted such that its coverage area extends to the corner of the building 50. According to one embodiment, the position of the first AP $16_1$ may be adjusted by moving the first AP $16_1$ along the line extending 45° from the corner A of the building 50.

Figure 8:
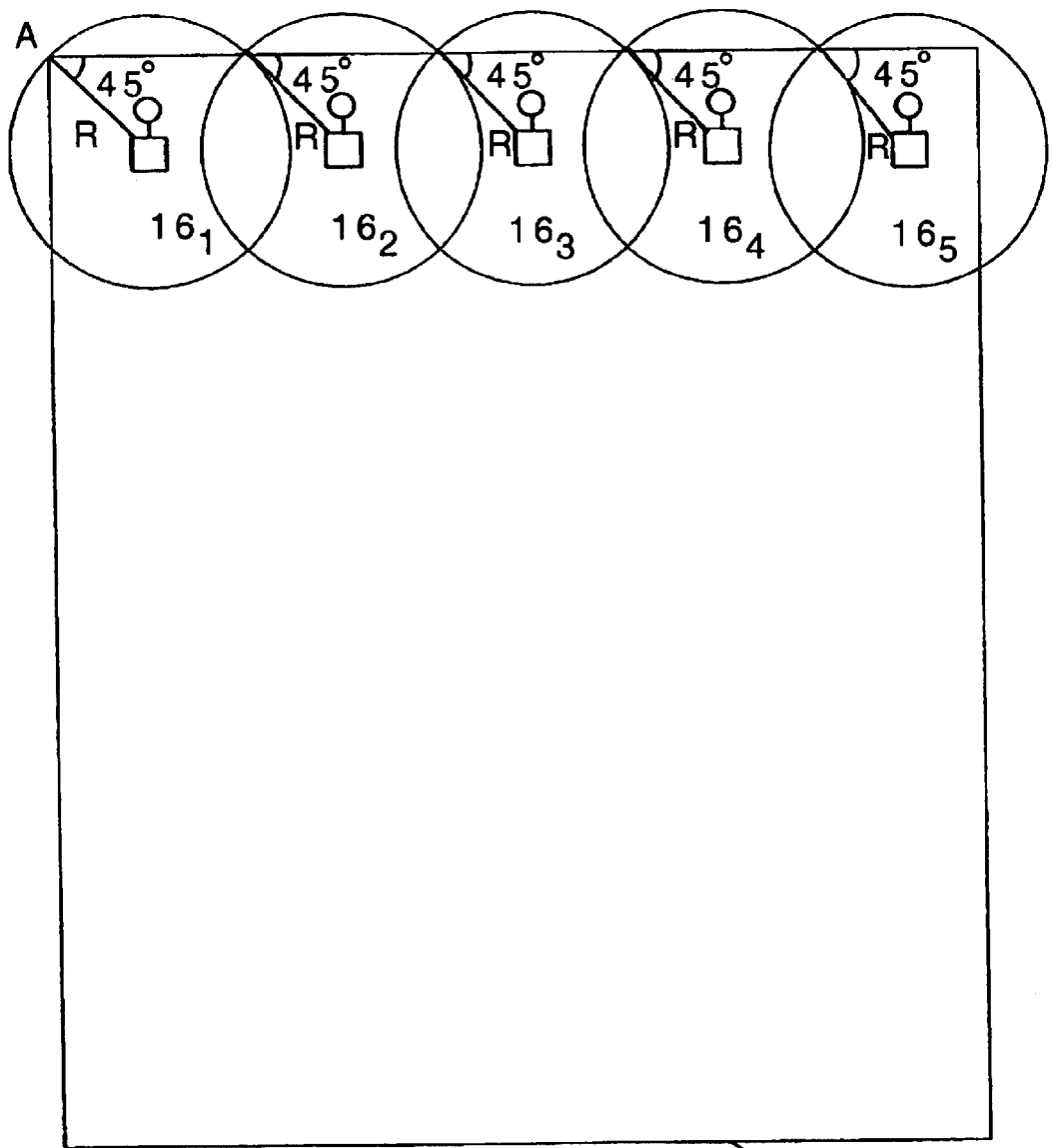
Figure 9:
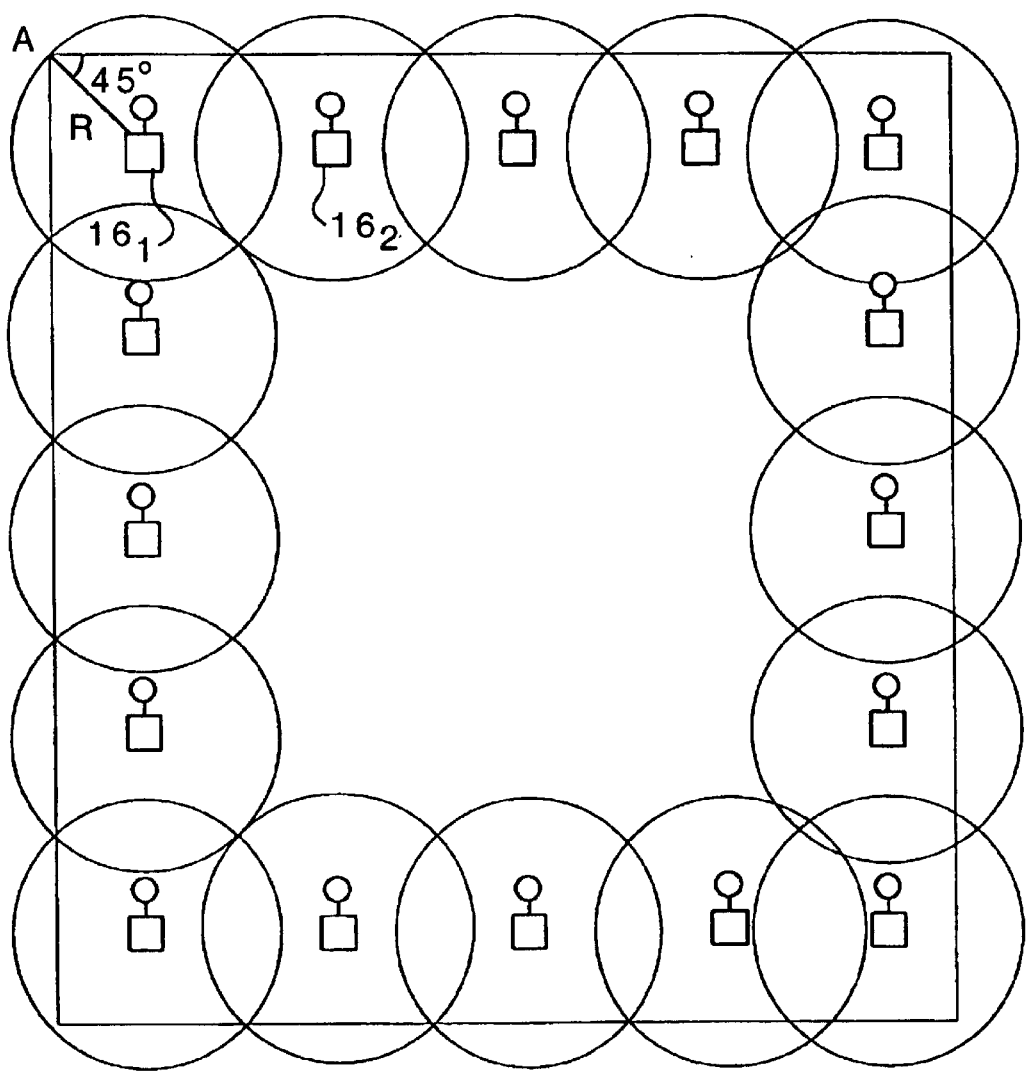

As illustrated in FIG. 8, the process of locating the first AP 16, may be repeated such that additional APs 16 are located along one edge of the building 50. For example, the position of a second AP $16_2$ may be determined by ascertaining the point at which the coverage area of the first AP $16_1$ intersects the edge of the building 50 and placing the second AP $16_2$ at the distance R from that point along a 45° degree angle extending from the point. The position of the second AP $16_2$ may be adjusted such that the coverage area of the second AP $16_2$ extends to the point where the coverage of the first AP $16_1$ intersects the edge of the building 50. In a similar fashion, additional APs 16 may be located along one edge of the building 50, as illustrated in FIG. 8, and around the other edges of the building 50, as illustrated in FIG. 9.

Figure 10:
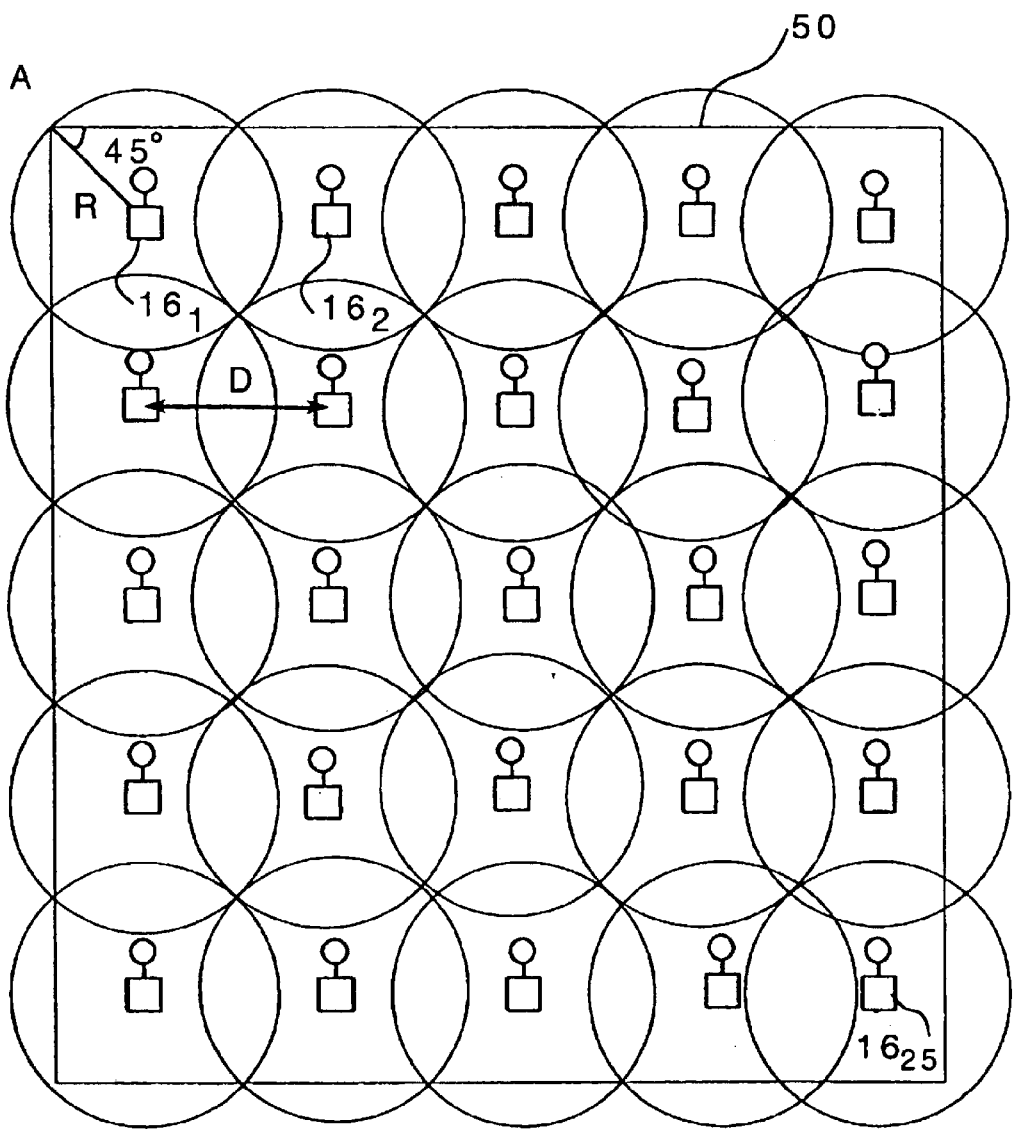

According to one embodiment, additional APs 16 may be located in the interior of the building 50, for example, as illustrated in FIG. 10, by positioning the additional APs 16 along a line extending parallel from an edge of the-building 50 at a distance D from an adjacent AP 16. The location of the APs 16 may be adjusted by measuring their respective coverage radii and readjusting their position to assure that coverage is continuous throughout the floor of the building 50.

EXAMPLE 4

FIGS. 11—15 illustrate another embodiment of the present invention, in which a wireless network is to be implemented on first and second contiguous floors of a building 50 where the width of the floors is greater than $R\sqrt{2}$. As discussed hereinbefore, the reference to "first" and "second" floor does not necessarily refer to the first and second floors of the building, but rather any two floors of a multi-floor building.

Figure 11:
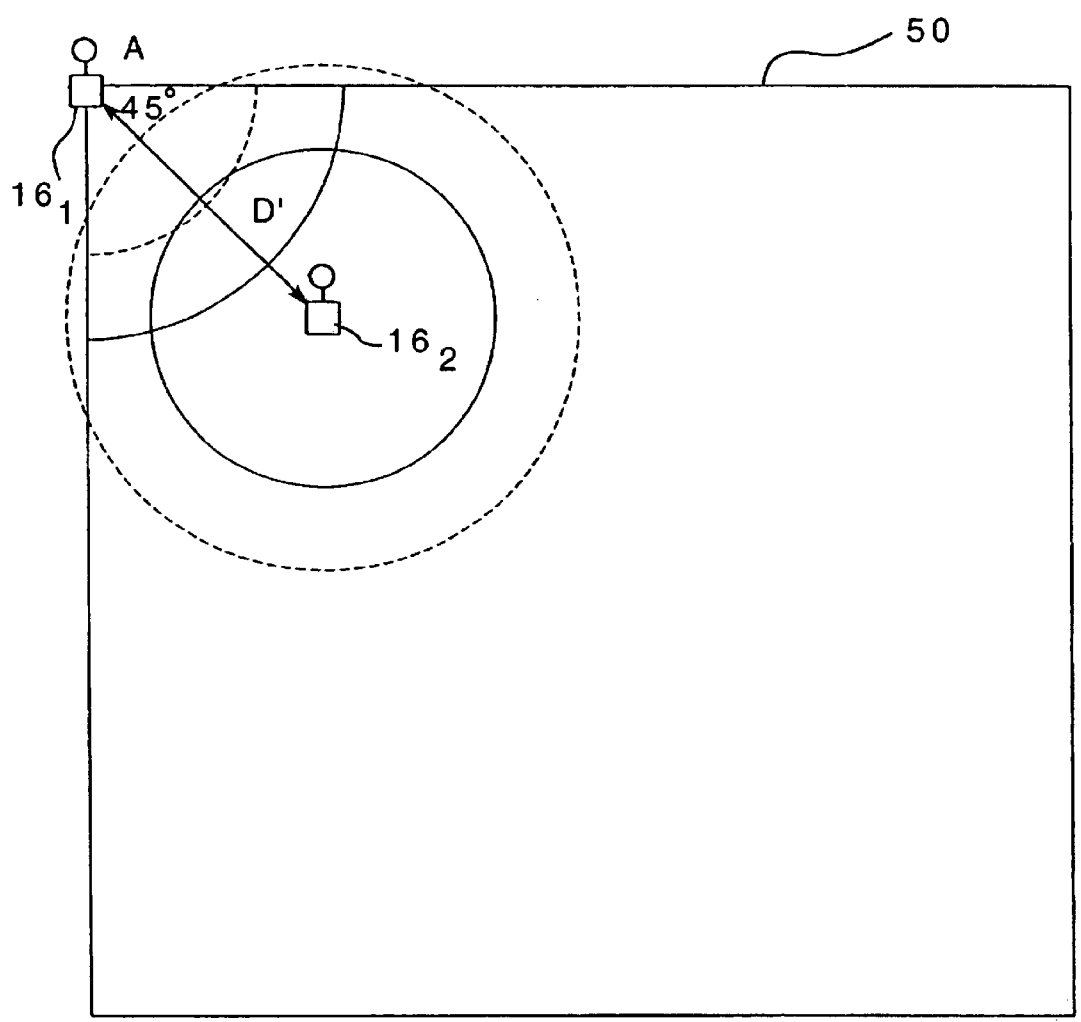
FIGS. 11–15 are graphical representations for establishing the location of the access points of the WLAN of FIG. 1 for a multi-floor environment according to one embodiment of the present invention where the width of the floors are greater than the average coverage radius of the access points times $\sqrt{2}$.

According to one embodiment, as illustrated in FIG. 11, a first AP $16_1$ may be located at a corner A of the building 50 on the second floor. A second AP $16_2$ may be located on the first floor at the distance D' from the corner of the building 50 along a line extending from the corner A, such as on a 45° angle. The locations of the first and second APs $16_{1,2}$ may be adjusted to assure that the edges of the coverage areas on the first floor intersect at two sides of the building 50. In the illustrated embodiment, the coverage areas of the APs 16 for the second floor of the building 50 are shown in solid lines, and the-coverage areas of the APs 16 for the first floor of the building 50 are shown in dashed lines, regardless of the floor on which the APs 16 are located.

Figure 12:
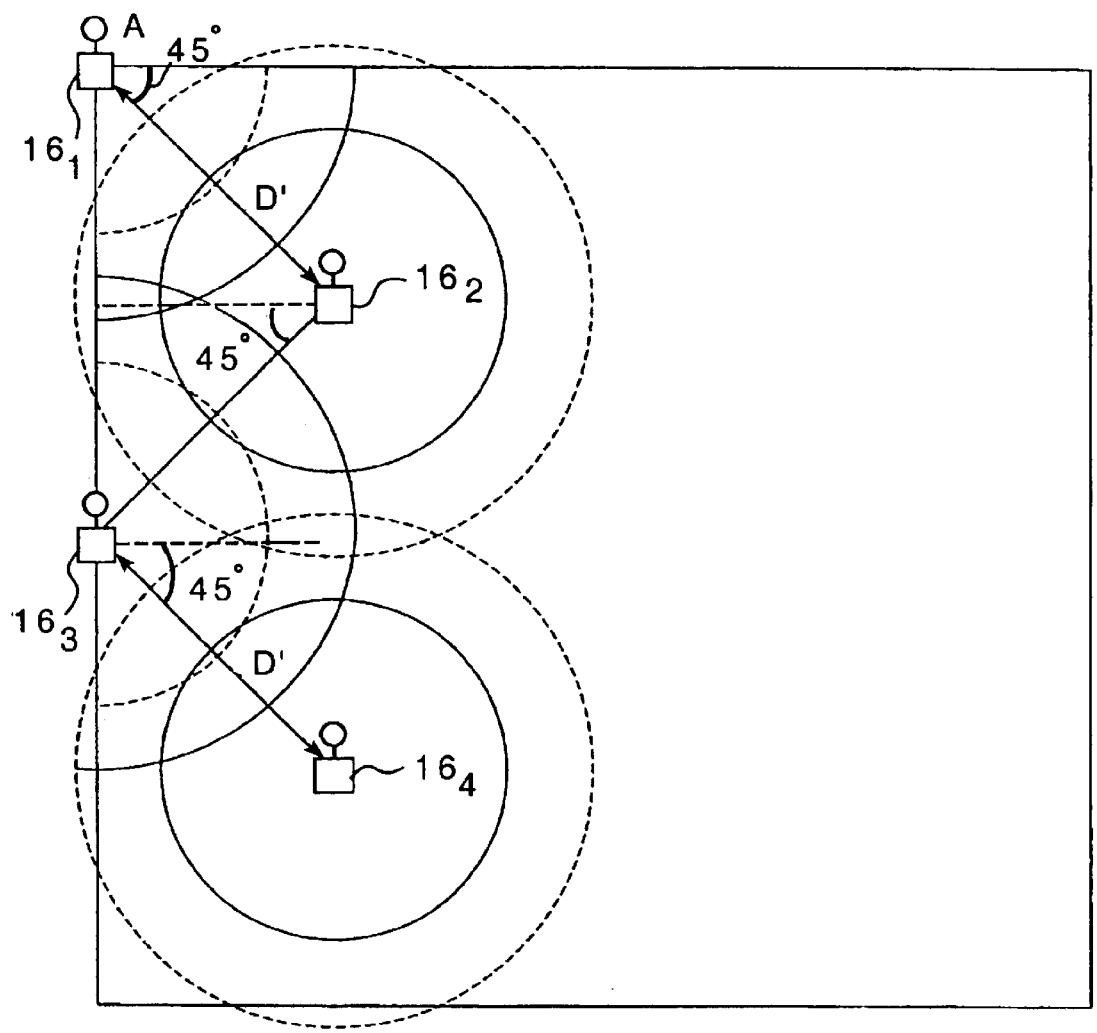

As illustrated in FIG. 12, a third AP $16_3$ may located on a side the second floor of the building 50 along a line extending, for example, 45° from the location of the second AP $16_2$. The location of the third AP $16_3$ may be adjusted to assure that the edges of the coverage areas of the second and third APs $16_{2,3}$ intersect at the side of the building 50 on the first floor and to assure that the first, second, and third APs $16_{1-3}$ provide continuous coverage on the second floor. A fourth AP $16_4$ may be located on the first floor of the building 50 at the distance D' from the third AP $16_3$ along a line extending from the third AP $16_3$, such as on a 45° angle. The location of the fourth AP $16_4$ may be adjusted to assure that the APs $16_{1-4}$ provide continuous wireless coverage on the first and second floors.

Figure 13:
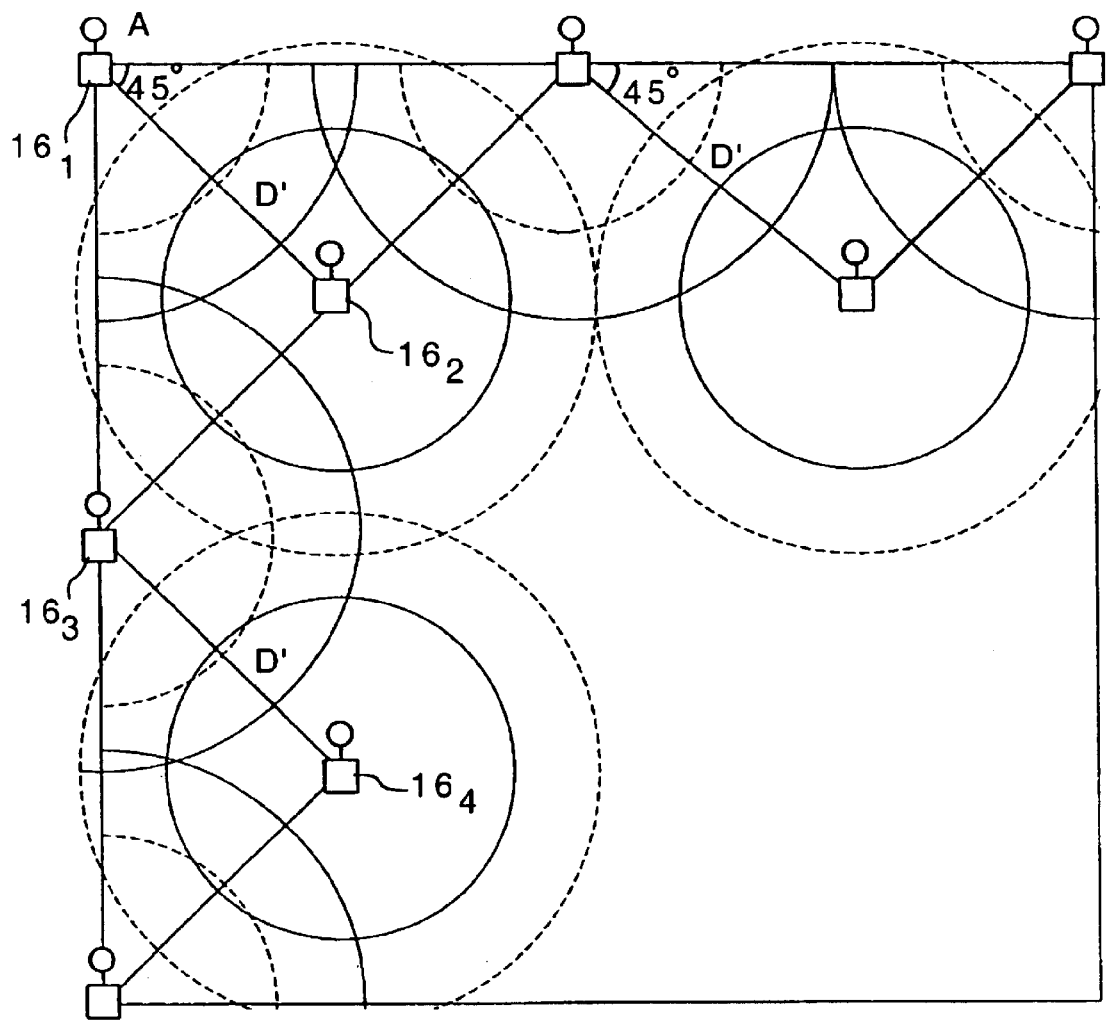
Figure 14:
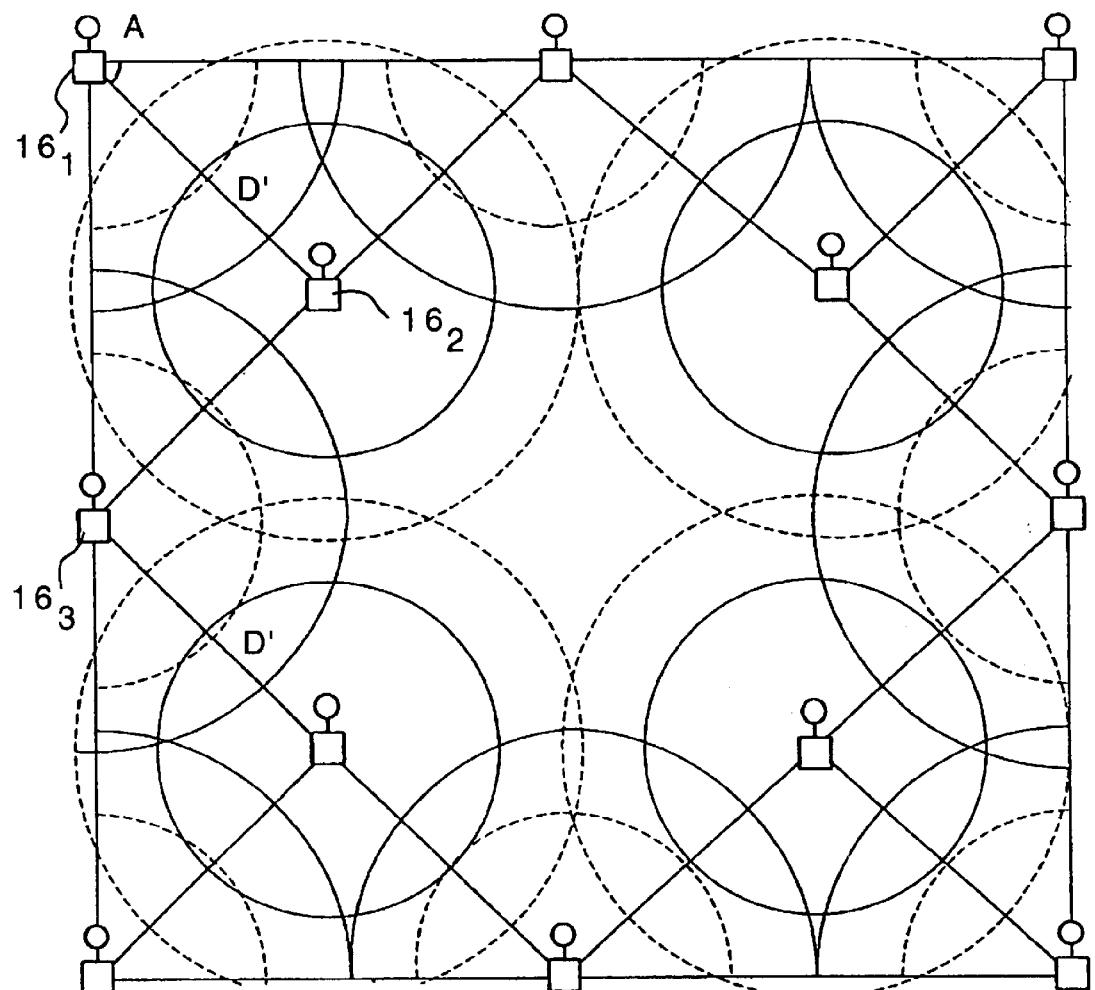

The process of locating the APs 16 on alternating floors of the building 50 may be repeated until coverage is provided along the sides of the building 50 extending from the corner A where the first AP 16₁ was positioned, as illustrated in FIG. 13. Additional APs 16 may then be positioned on alternating floors of the building 50 in a similar fashion along the remaining sides of the building 50, as illustrated in FIG. 14.

Figure 15:
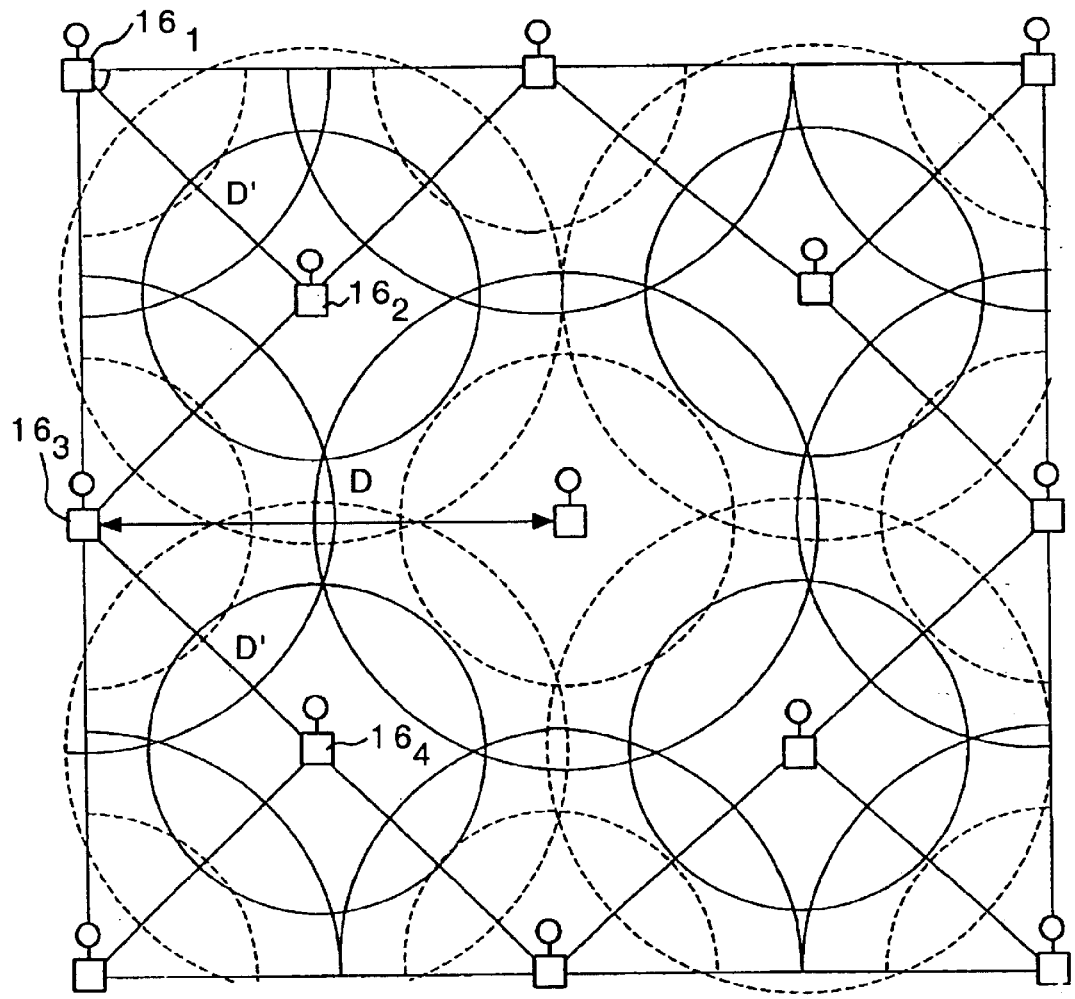

According to one embodiment, additional APs 16 may be placed to provide coverage for the interior of the building 50 along parallel lines extending perpendicularly from a side of the building 50 on the same floor and at a distance D from an adjacent AP 16, as illustrated in FIG. 15. The coverage radii of the APs 16 may be measured and the their respective positions adjusted as necessary to assure that continuous coverage is provided on both the first and second floors.

To provide-wireless coverage on additional contiguous floors of the building 50, a number of APs 16 may be located on a third floor in positions directly above the locations of the APs 16 on the first floor of the building 50 (assuming the second floor is between the first and third floors). The locations of the APs 16 on the third floor may be adjusted such that the APs 16 on the second and third floors provide complete wireless coverage for the third floor. In addition, a number of APs 16 may be placed on the fourth floor of the building 50 directly above the APs 16 located on the second floor (assuming the third floor is between the second and fourth floors). The locations of the APs 16 on the fourth floor may be adjusted such that the APs 16 located on the third and fourth floors provide complete wireless coverage on the fourth floor. Additional APs 16 may be placed on additional floors of the building 50 and their respective positions adjusted according to the above-described process to provide wireless coverage on the additional floors of the building 50.

As discussed hereinbefore, where-regions of the environment, such as certain floors of the building 50, may be conceptually divided into regions which are relatively isolated from each other, from a signal propagation perspective, these regions may be treated independently in establishing the locations of the APs 16 for the wireless network. In addition, where certain regions of the environment are expected to have increased wireless traffic capacity, such as for classrooms and lecture halls, translating into effectively smaller coverage radii for the APs 16, these regions may be treated independently in establishing the locations of the APs 16.

The process of establishing the locations of the APs 16 for a wireless network, such as described hereinbefore, may be facilitated, for example, by software code to be executed by a processor of a computing device, such as a workstation or a personal computer. The software code may use any suitable computer language such as, for example, C or C++ and may use, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

For example, the software code may include instructions, which when executed by a processor, cause the processor to calculate the parameters D and D' based on the measured values for R and R', and generate text and/or graphical instructions for implementing the wireless network based on the parameters of the particular environment such as, for example, the width of the floor(s) and the number of contiguous floors for which continuous wireless coverage is sought.

Figure 16:
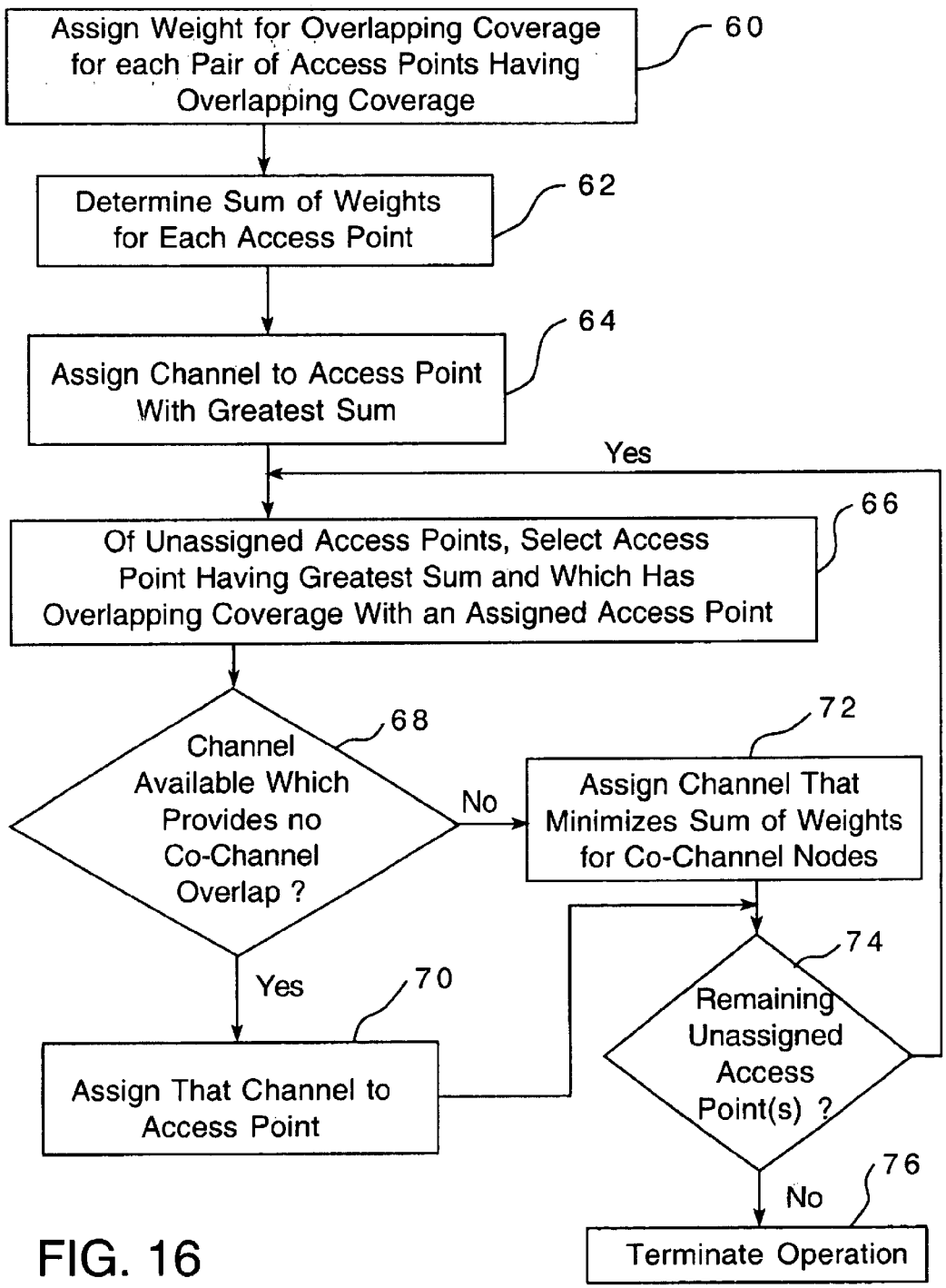
FIG. 16 is a flowchart illustrating a method for assigning channels for the access points of the WLAN of FIG. 1 according to one embodiment of the present invention.

FIG. 16 is a block diagram of the process flow for assigning channels for the APs 16 according to one embodiment of the present invention. It should be recognized that the process is applicable for both indoor and outdoor wireless environments.

The process begins at block 60 where a weight is assigned to each respective pair of APs 16 having overlapping coverage areas. The assigned weight may be, for example, indicative of the degree of coverage overlap between the respective pairs of APs 16. For example, for an indoor environment, the weight may be indicative of the number of square feet of floor area of overlapping coverage or, for an outdoor environment, the weight may be indicative of the number of square miles of overlapping coverage. According to one embodiment, the weight may be determined based on the strength of a signal received by one AP 16 from another AP 16, because the signal strength is indicative of the degree of overlapping coverage between the two APs 16.

From block 60, the process advances to block 62 where the sum of weights for each AP 16 is determined. That is, for a particular AP 16, the weights for all of the other APs 16 having overlapping coverage with that particular AP 16 are summed. At block 64, a channel is assigned to the AP 16 having the greatest sum of weights. Where two or more APs 16 have the same greatest sum, a channel may be assigned to just one.

From block 64, the process advances to block 66 where, of the APs 16 not having channels assigned thereto, the AP 16 having the greatest sum of weights and which has overlapping coverage with an AP 16 having an assigned channel is selected. Where two or more such APs 16 have the same greatest sum, just one of the APs 16 may be selected.

At decision block 68, it is then determined whether a channel is available for the selected AP 16 which provides no co-channel overlapping coverage with another AP 16. If there is such a channel, the process advances to block 70, where that channel is assigned to the selected AP 16. Conversely, if there is not such a channel, the process advance to block 72, where the selected AP 16 is assigned a channel that minimizes the sum of weights for co-channel APs 16.

From both blocks 70 and 72 the process advances to block 74, where it is determined whether there remains an AP 16 for which a channel has not been assigned. If there is a remaining unassigned AP 16, the process returns to block 66. Conversely, if there are no remaining unassigned APs 16, the process continues to block 76, where the process is terminated because all of the APs 16 have been assigned a channel.

Figure 17:
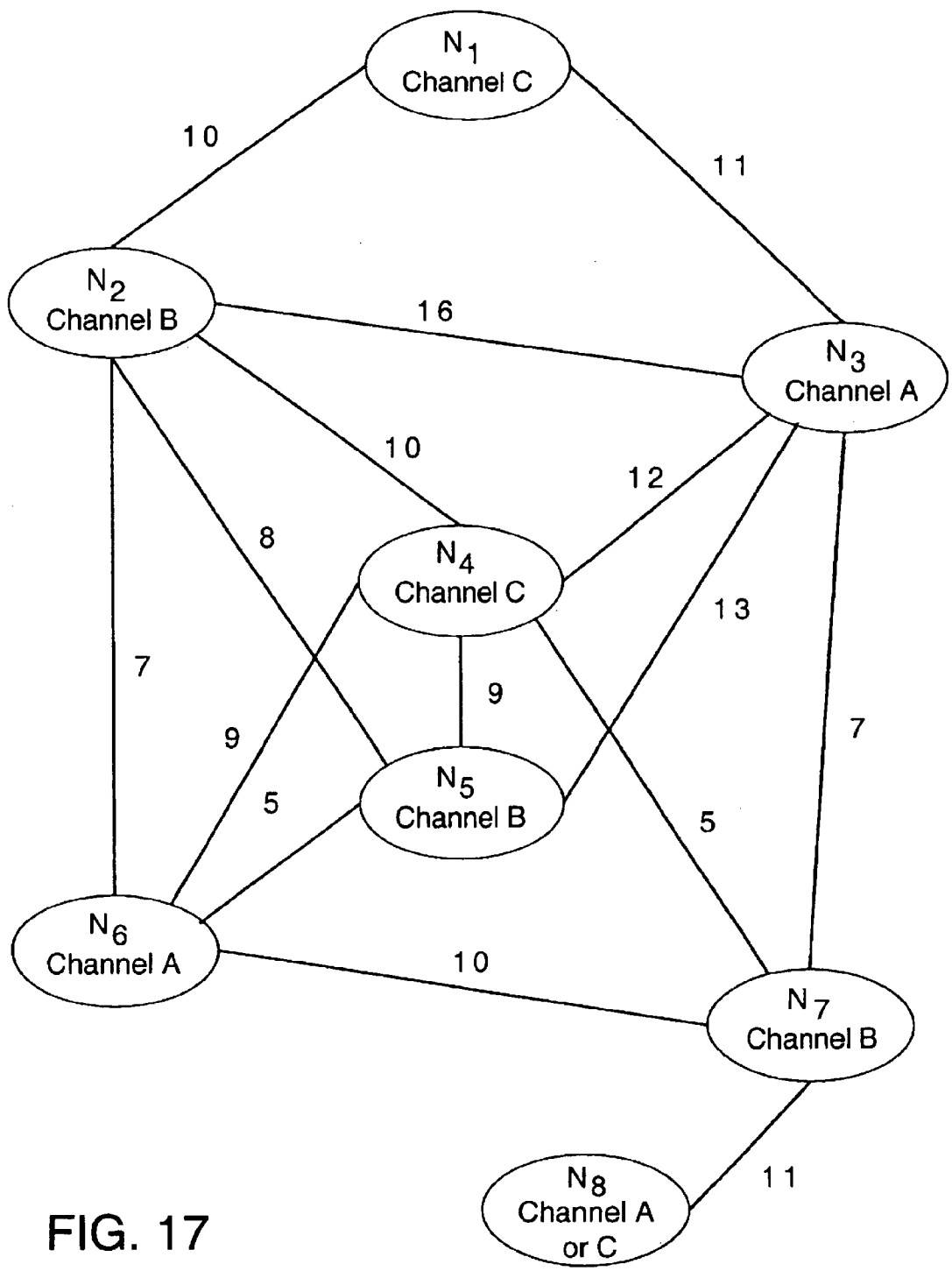
FIG. 17 is a graphical representation of the method of FIG. 16 for assigning channels for the access points.

FIG. 17 is a graphical representation for assigning channels for the APs 16 according the process described hereinbefore with respect to FIG. 16. For purposes of the illustrated example, it is assumed that three different channels are available for the wireless network, denoted as channels A, B, and C, although for other wireless network embodiments, a different number of channels may be employed.

In the graphical representation, the APs 16 are represented by nodes $N_{1-8}$. For each pair of APs 16 having overlapping coverage, a line is provided between their corresponding nodes $N_{1-8}$, with an associated number representing the degree of the overlapping coverage. For example, as shown in FIG. 17, the overlapping coverage between nodes $N_1$ and $N_2$ has been assigned a weight of 10, and the overlapping coverage between nodes $N_1$ and $N_3$ has been assigned a weight of 11. In addition, as shown in FIG. 17, there is no overlapping coverage, for example, between nodes $N_1$ and $N_4$. Accordingly, the "sum of weights" for a particular AP 16 corresponds to the sum of the weights assigned to each of the lines connected to the node representative of that particular AP 16. Note that the locations of the nodes $N_{1-8}$ in the graphical representation illustrated in FIG. 17 need not be representative of the configuration of the APs 16. Rather, the assigned weights of overlapping coverage between the nodes is based on the coverage area measurements of the APs 16 for a particular configuration.

Reviewing the graphical representation of FIG. 17, it can been seen that the node having the greatest sum of weights is node $N_3$, with a sum of fifty-nine. Accordingly, the AP 16 corresponding to node $N_3$ is assigned a channel, which for the illustrated example is channel A. Of the unassigned nodes, the node having the greatest sum of weights and which has overlapping coverage with node $N_3$ is node $N_2$, with a sum of fifty-one. Thus, node $N_2$ may be assigned either channel B or channel C to avoid co-channel overlap with node $N_3$. For purposes of the illustrated example, node $N_3$ is assigned the channel B.

Next, of the unassigned nodes, the node having the greatest sum of weights and which has overlapping coverage with an assigned node (i.e., either node $N_2$ or $N_3$) is node $N_4$, with a sum of forty-five. To avoid co-channel overlapping coverage with both nodes $N_2$ and $N_3$, node $N_4$ may be assigned the channel C. Having assigned channels for nodes $N_{2-4}$, the unassigned node having the greatest sum of weights and having overlapping coverage with an assigned node (i.e., either of nodes $N_{2-4}$) is node $N_5$, with a sum of thirty-five. As can been seen, there is no channel available for node $N_5$ which provides no co-channel overlapping coverage with an already-assigned node. Accordingly, node $N_5$ is assigned a channel which minimizes co-channel overlapping coverage. In the illustrated example, node $N_5$ is assigned the channel B because node $N_5$ has the least overlapping coverage with node $N_2$.

This process may be repeated in a similar fashion until all of the nodes (and hence corresponding APs 16 ) have been assigned a channel. Note that node $N_8$, which for the illustrated example has overlapping coverage with only node $N_7$, may be assigned either channel A or C to avoid overlapping coverage with node $N_7$.

Figure 18:
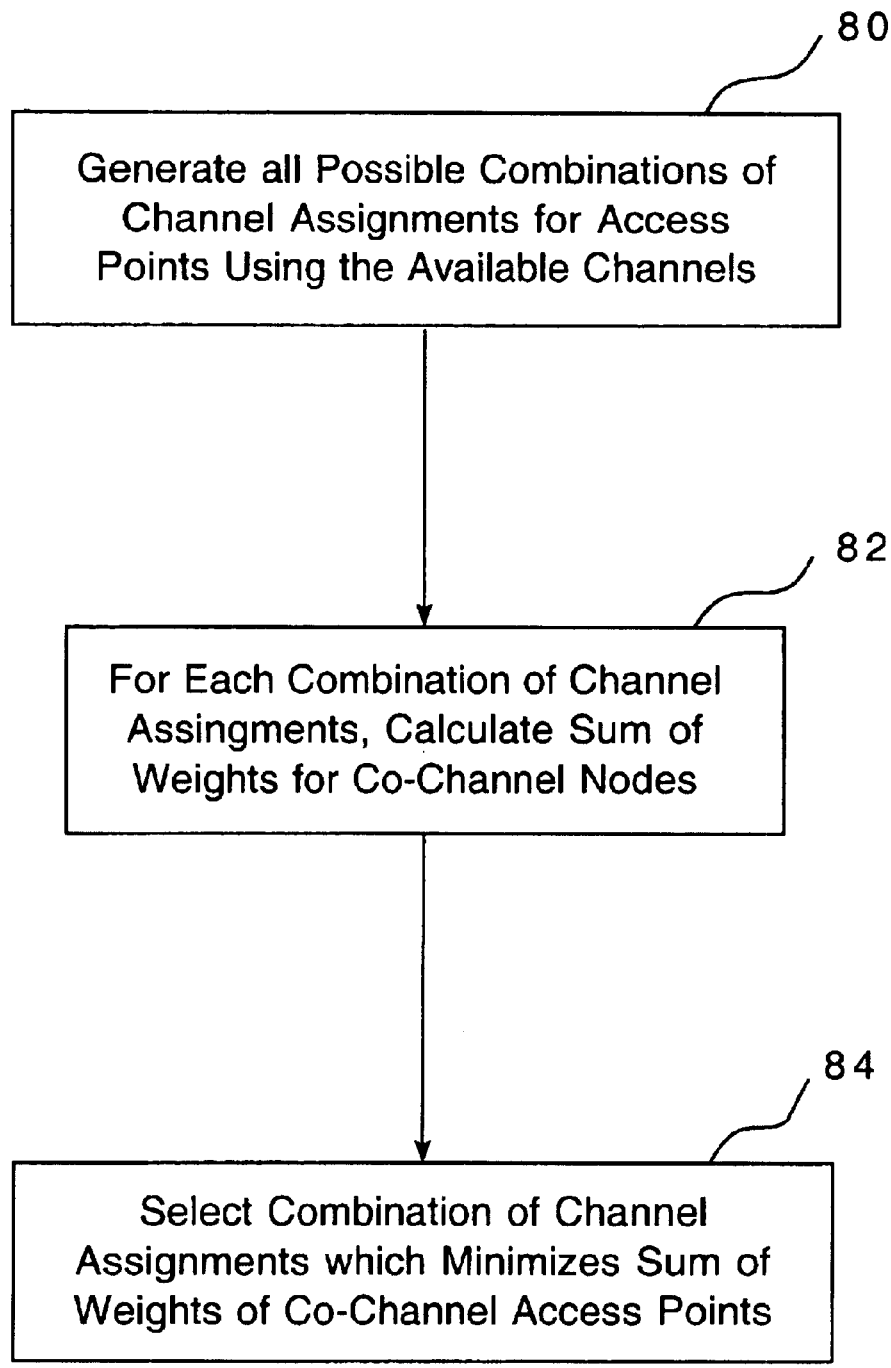
FIG. 18 is a flowchart illustrating a method for assigning channels for the access points of the WLAN of FIG. 1 according to another embodiment of the present invention.

FIG. 18 is a block diagram of a process for assigning channels for the APs 16 of a wireless network according to another embodiment of the present invention. The process begins at block 80, where all the possible combinations of channel assignments for the APs 16 are generated using all the available channels. The process flow then advances to block 82, where for each of the generated combinations, the sum of the weights for co-channel APs 16 having overlapping coverage is calculated. The process flow then continues to block 84, where the APs 16 are assigned channels according to the channel assignment combination which minimizes the sum of the weights of co-channel APs 16 having overlapping coverage.

The processes of FIGS. 16 and 18 for assigning channels for the APs 16 of the wireless network 10 may be facilitated, for example, by software code to be executed by a processor of a computing device, such as a workstation or a personal computer. The software code may use any suitable computer language such as, for example, C or C++ and may use, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

For example, the software code may include instructions, which when executed by a processor, cause the processor to implement the process of assigning channels according to the process illustrated in FIG. 16. For example, according to such an embodiment, the software code may include instructions, which when executed by the processor, cause the processor to determine the sum of the weights of the overlapping coverage for each of the APs 16 of the networks 10 based on the measured coverage areas of the APs 16 and to assign channels to the APs 16 to minimize co-channel overlapping coverage.

In addition, the software code may include instructions, which when executed by a processor, cause the processor to implement the process of assigning channels according to the process illustrated in FIG. 18. For example, according to such an embodiment, the software code may include instructions, which when executed by the processor, cause the processor to generate all the possible channel assignment combinations for the APs 16 using the available channels, calculate the sum of the weights of co-channel overlapping coverage for APs, and selecting the combination of channel assignments which minimizes the sum of the weights of co-channel overlapping coverage. It may be recognized that the computer-implemented execution of the process illustrated in FIG. 18 may take longer than the computer-implemented execution of the process illustrated in FIG. 16 because the process of FIG. 18 requires the generation and evaluation of all the possible channel assignment combinations. It may further be recognized that while the process of FIG. 16, may yield an acceptable result with less execution time, the process of FIG. 18 will yield an optimal channel assignment configuration for minimizing co-channel overlapping coverage.

Although the present embodiment has been described herein with reference to certain embodiments, those of ordinary skill in the art will recognize that many modifications and variations of the present invention may be implemented. The foregoing description and the following claims are intended to cover all such modifications and variations.

What is claimed is:

1. A method for establishing the location of access points for a network providing wireless communications coverage for an environment, wherein the network is to provide wireless communications coverage for a single floor having a width no greater than an average coverage radius of the network access points times $\sqrt{2}$, comprising:

determining a coverage radius of an access point at certain locations within the environment;

determining the average coverage radius of the access points for the environment based on the determined coverage radii; and positioning the access points at locations within the environment to provide continuous wireless coverage for the environment based on the average coverage radius, wherein positioning the access points includes:

positioning a first access point at a first location corresponding to an intersection of a bisector of the floor and a line extending at an angle from a first corner of the floor; and adjusting a position of the first access point such that wireless coverage is provided at the first corner of the floor and at a second corner of the floor.

2. The method of claim 1, wherein determining a coverage radius of an access point at certain locations within the environment includes:

generating a set of signal strength measurements within the environment; and measuring the coverage radius of an access point at certain locations within the environment.

3. The method of claim 1, further comprising documenting the locations of the access points.

4. The method of claim 3, further comprising documenting the coverage radii of the access points.

5. The method of claim 1, wherein positioning the access points includes:

positioning the access points at locations within the environment according to an initial configuration based on the average coverage radius;

measuring the coverage radius of the access points; and readjusting the locations of the access points to provide continuous wireless coverage for the environment.

6. The method of claim 1, wherein positioning the access points within the environment according to the initial configuration further includes:

positioning a second access point along the bisector of the floor at a distance from the first access point; and adjusting a position of the second access point such that a coverage radius of the second access point coincides with a coverage radius of the first access points at first and second edges of the floor.

7. A computer readable medium, having stored thereon instructions which, when executed by a processor, cause the processor to:

determine a distance between access points of a network for providing wireless communications coverage for an environment, including:

determine a distance between access points on a same floor; and determine a distance between access points of contiguous floors; and provide instructions for establishing positions of the access points within the environment to provide continuous wireless coverage for the environment based on the determined distance between access points and parameters of the environment.

8. The computer readable medium of claim 7, having further stored thereon instructions which, when executed by the processor cause the processor to provide instructions for establishing positions of the access points within the environment, the instructions selected from the group consisting of textual instructions and graphical instructions.

9. A method for establishing the location of access points for a network providing wireless communications coverage for an environment, wherein the network is to provide wireless communications coverage for first and second contiguous floors each having a width no greater than an average coverage radius of the network access points times $\sqrt{2}$, comprising:

determining a coverage radius of an access point at certain locations within the environment;

determining the average coverage radius of the access points for the environment based on the determined coverage radii; and positioning the access points at locations within the environment to provide continuous wireless coverage for the environment based on the average coverage radius, wherein positioning the access points includes:

positioning a first access point at a location on the second floor along a bisector of the second floor such that wireless coverage is provided at first and second corners of the first floor; and positioning a second access point at a location on the first floor along the bisector such that a coverage radius of the second access point coincides with a coverage radius of the first access points at first and second edges of the first and second floors.

10. The method of claim 9, wherein positioning the access points within the environment according to the initial configuration further includes positioning a third access point at a location on the second floor along the bisector such that a coverage radius of the third access point coincides with the coverage radius of the second access point at the first and second edges of the first and second floors.

11. The method of claim 9, wherein the network is to provide wireless communications coverage for a third floors contiguous to the second floor and having a width no greater than the average coverage radius of the access points times $\sqrt{2}$, and positioning the access points within the environment according to the initial configuration further includes positioning a fourth access point at a location on the third floor above the location of the second access point.

12. The method of claim 9, wherein determining a coverage radius of an access point at certain locations within the environment includes:

generating a set of signal strength measurements within the environment; and measuring the coverage radius of an access point at certain locations within the environment.

13. A method for establishing the location of access points for a network providing wireless communications coverage for an environment, wherein the network is to provide wireless communications coverage for a single floor having a width greater than the average coverage radius of the network access points times $\sqrt{2}$, comprising:

determining a coverage radius of an access point at certain locations within the environment;

determining the average coverage radius of the access points for the environment based on the determined coverage radii; and positioning the access points at locations within the environment to provide continuous wireless coverage for the environment based on the average coverage radius, wherein positioning the access points includes:

positioning a first access point on the floor at a distance along a line extending at an angle from a first corner of the floor such that wireless coverage is provided at the first corner; and positioning a second access point on the floor at a distance along a line extending at an angle from a first location corresponding an intersection of a coverage radius of the first access point and a first edge of the floor such that wireless coverage is provided at the first location.

14. The method of claim 13, wherein positioning the access points within the environment according to the initial configuration further includes positioning a third access point at a distance along a line extending at an angle from a second location corresponding an intersection of a coverage radius of the first access point and a second edge of the floor such that wireless coverage is provided at the second location.

15. The method of claim 13, wherein determining a coverage radius of an access point at certain locations within the environment includes:

generating a set of signal strength measurements within the environment; and measuring the coverage radius of an access point at certain locations within the environment.

16. A method for establishing the location of access points for a network providing wireless communications coverage for an environment, wherein the network is to provide wireless communications coverage for first and second contiguous floors each having a width greater than the average coverage radius of the access points times $\sqrt{2}$, comprising:

- determining a coverage radius of an access point at certain locations within the environment;
- determining the average coverage radius of the access points for the environment based on the determined coverage radii; and
- positioning the access points at locations within the environment to provide continuous wireless coverage for the environment based on the average coverage radius, wherein positioning the access points includes:
  - positioning a first access point on the second floor at a first corner; and
  - positioning a second access point on the first floor at a location along a line extending from the first corner at an angle such that a coverage radius of the second access point coincides with a coverage radius of the first access point of the first floor at first and second edges of the first floor.

17. The method of claim 16, wherein positioning the access points within the environment according to the initial configuration further includes positioning a third access point on the second floor along the first edge such that a coverage radius of the third access point coincides with the coverage radius of the first access point at the first edge of the second floor and such that the coverage radius of the third access point coincides with the coverage radius of the second access point at the first edge of the first floor.

18. The method of claim 16, wherein the network is to provide wireless communications coverage for a third floor contiguous to the second floor and having a width greater than the average coverage radius of the access points times $\sqrt{2}$, and positioning the access points within the environment according to the initial configuration further includes positioning a fourth access point at a location on the third floor above the location of the second access point.

19. The method of claim 16, wherein determining a coverage radius of an access point at certain locations within the environment includes:

- generating a set of signal strength measurements within the environment; and
- measuring the coverage radius of an access point at certain locations within the environment.

\* \* \* \* \*

UNITED STATES PATENT AND TRADEMARK OFFICE
CERTIFICATE OF CORRECTION

PATENT NO. : 6,711,148 B1
DATED : March 23, 2004
INVENTOR(S) : Hills

It is certified that error appears in the above-identified patent and that said Letters Patent is hereby corrected as shown below:

<u>Column 7,</u>
Line 27, add a space between "D" and "From"

<u>Column 9,</u>
Line 15, remove the hyphen between "provide-wireless"
Line 35, remove the hyphen between "where-regions"

Signed and Sealed this

Seventh Day of September, 2004

JON W. DUDAS
*Director of the United States Patent and Trademark Office*